(12) United States Patent
Goletto et al.

(10) Patent No.: US 9,506,244 B2
(45) Date of Patent: Nov. 29, 2016

(54) HIGH-PERFORMANCE HEAT-INSULATING MATERIALS

(75) Inventors: Valerie Goletto, Maisons Alfort (FR); David Louapre, Paris (FR); Caroline Parneix, Rueil-Malmaison (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 108 days.

(21) Appl. No.: 14/232,453

(22) PCT Filed: Jul. 12, 2012

(86) PCT No.: PCT/FR2012/051661
§ 371 (c)(1),
(2), (4) Date: Jan. 24, 2014

(87) PCT Pub. No.: WO2013/007957
PCT Pub. Date: Jan. 17, 2013

(65) Prior Publication Data
US 2014/0183401 A1    Jul. 3, 2014

(30) Foreign Application Priority Data
Jul. 13, 2011    (FR) .................... 11 56427

(51) Int. Cl.
| | |
|---|---|
| *C08J 9/00* | (2006.01) |
| *C08J 9/30* | (2006.01) |
| *F16L 59/00* | (2006.01) |
| *C04B 26/06* | (2006.01) |
| *C04B 38/00* | (2006.01) |
| *C04B 28/24* | (2006.01) |
| *C04B 14/28* | (2006.01) |
| *C04B 14/06* | (2006.01) |
| *E04B 1/78* | (2006.01) |
| *B29C 44/34* | (2006.01) |
| *B29C 67/20* | (2006.01) |

(52) U.S. Cl.
CPC ................. *E04B 1/78* (2013.01); *B29C 44/34* (2013.01); *B29C 67/20* (2013.01); *C04B 26/06* (2013.01); *C04B 28/24* (2013.01); *C08J 9/0066* (2013.01); *C08J 9/30* (2013.01); *C04B 2201/20* (2013.01); *C04B 2201/32* (2013.01); *C08J 2205/042* (2013.01); *C08J 2205/044* (2013.01); *C08J 2205/048* (2013.01)

(58) Field of Classification Search
CPC .......... E04B 1/78; B29C 44/34; B29C 67/20
See application file for complete search history.

(56) References Cited

U.S. PATENT DOCUMENTS

| | | | |
|---|---|---|---|
| 9,045,609 B2 * | 6/2015 | Pasquero | ............... C08J 9/0066 |
| 2004/0077738 A1 | 4/2004 | Field et al. | |
| 2012/0097907 A1 | 4/2012 | Bauer et al. | |

FOREIGN PATENT DOCUMENTS

| | | | |
|---|---|---|---|
| EP | 1 892 226 A2 | | 2/2008 |
| WO | WO 00/01640 A1 | | 1/2000 |
| WO | WO 03/097227 A1 | | 11/2003 |
| WO | WO 2006/134080 A1 | | 12/2006 |
| WO | WO 2010/126792 | * | 11/2010 |
| WO | WO 2010/126792 A1 | | 11/2010 |
| WO | WO 2011/015751 A1 | | 2/2011 |
| WO | WO 2011095745 | * | 8/2011 |

OTHER PUBLICATIONS

International Search Report issued Oct. 5, 2012, in PCT/FR12/051661 filed Jul. 12, 2012.

* cited by examiner

*Primary Examiner* — Carol M Koslow
(74) *Attorney, Agent, or Firm* — Oblon, McClelland, Maier & Neustadt, L.L.P.

(57) ABSTRACT

The present invention relates to a heat-insulating material, in particular in the form of a solid foam, based on mineral particles of submicron porosity, this material incorporating two different ranges of porosities, advantageously including a first range consisting of (macro)pores with diameters of between 10 microns and 3 mm, and a second range consisting of submicron pores with diameters greater than 4 nm and less than 1 μm, the pore volume of said submicron pores being at least 0.5 cm$^3$/g and the mass per unit volume of said insulating material being less than 300 kg/m$^3$.

20 Claims, No Drawings

HIGH-PERFORMANCE HEAT-INSULATING MATERIALS

The present invention relates to a high-performance heat-insulating material, to the process for manufacturing it, and to its use in the construction field for insulating the walls (exterior or interior) of buildings or for filling interstices in materials (hollow walls or "cavity walls", pipes, etc.), this insulating material possibly being in the form of panels, or optionally in the form of granules, blocks, layers, projections, moldings, etc.

Whether it concerns the new construction or the renovation market, the demand for efficient insulating products, in particular heat-insulating products, is still just as great. Besides increased insulating properties and compliance with the specifications of building works, the demand for products that offer greater comfort of use, longevity, savings in raw materials, etc. with a view especially to sustainable development, is also increasing. It is particularly advantageous, in this search for materials offering better heat insulation, that said materials should also have, or even improve upon, other desired properties in the construction of buildings, especially as regards load lightening, mechanical strength, sound insulation, etc.

A wide variety of heat insulators is currently known. Among the most common products, mention may be made of fibrous insulators, based on natural or synthetic fibers such as glass wool or rock wool, cellular insulators of the expanded polymer type such as expanded or extruded polystyrene, or phenolic or polyurethane foams. The thermal performance qualities of essentially mineral insulating materials are reflected by heat conductivity values $\lambda$ commonly greater than 35, in particular of the order of 40 mW/m·K, which values may be lower in the case of essentially organic insulators, for example in the case of cellular insulators incorporating a gas with a lower heat conductivity than air, to improve the thermal performance qualities. One drawback of these materials is, however, the difficulty in keeping the gas within the matrix over time, since the material loses on aging part of these thermal performance qualities. What is more, for organic insulators, the fire reaction is poor on account of their nature.

Use may also be made of materials in which a vacuum has been created so as to form, for example, panels under vacuum. These insulators are difficult to use since they can neither be cut nor pierced, and they may undergo a gradual loss of vacuum over long periods.

Insulators that may also be mentioned are aerogels, generally in the form of translucent granules or powder with grain or granule sizes conventionally of the order of a millimeter, these aerogels being particularly efficient in terms of heat insulation, but their poor mechanical properties require them to be used with protections or a reinforcing agent, or aerogels within mats (or plies) formed from entangled fibers (mechanically strong) for which it may be difficult to give a determined shape. These aerogels (in particular of silica) are difficult and expensive to obtain at the industrial scale, they require intricate drying conditions and their combination with other insulators to obtain mechanical strength or an adequate form may be complex. Their use thus remains limited.

There is consequently a strong need to develop materials that are efficient in terms of heat insulation, but that are also easier and less expensive to manufacture industrially (in particular produced from abundant starting materials) than aerogels in particular. Besides its good heat performance qualities (improved relative to the current mineral products), it is desirable for the product to have good resistance (especially to aging, or in terms of mechanical strength or the like: chemical resistance, fire resistance, etc.) without emburdening its charge. It is also desirable for it to remain easy to spread during its hardening and for it to enable the preparation of any desirable form, especially by molding (or optionally by spreading or spraying of a layer).

The present invention achieves this aim and thus overcomes the drawbacks seen previously by proposing a novel heat-insulating material, in particular (at least) in the form of a solid foam, this material being formed from (or made from, or based on) mineral particles of (or having) sub-micron porosity (i.e. comprising pores with diameters of less than 1 µm), this material integrating (or comprising or combining) two different (or distinct or disjoint) ranges of porosity, advantageously including a first range (referred to as macroporosity in the present invention), consisting of pores (referred to as macropores) with diameters (i.e. having a diameter distribution) of between 10 microns et 3 mm, in particular between a few tens and a few hundred microns (and especially between 10 and 500 µm), and a second range (referred to as submicron porosity in the present invention) consisting of pores (referred to as submicron pores) with diameters (i.e. having a diameter distribution) of greater than 4 nm, preferably greater than 5 nm, and less than 1 µm, the pore volume of said submicron pores being at least 0.5 cm$^3$/g (i.e. 0.5 cm$^3$ per gram of material) and the mass per unit volume (apparent or global, i.e. measured on the entire product) of the insulating material being less than 300 kg/m$^3$.

The product according to the invention thus comprises two porosities/two types of pore (which are significantly differentiated by their size (in the present case two distinct pore size distributions about two distinct peaks are observed), qualified in the present case by their diameter), the pores of one category (such as the submicron pores) being present between the pores of another category (such as the macropores). In general and advantageously, only two porosities/types of pore are present in the product, but it is not excluded for the product to be able to comprise more than two porosities/types of pore (especially about distinct distribution peaks). The diameter for qualifying the submicron pores is calculated, as explained hereinbelow, from the pore volume measurements by mercury intrusion porosimetry, using the Washburn equation, the diameter of the macropores being measured by scanning electron microscopy (SEM) or by X-ray tomography.

The product has, especially and advantageously, pores (and is formed from particles having pores) of submicron size with diameters of greater than 4 nm, generally greater than 5 nm, especially greater than 7 nm and in particular greater than 10 nm, and less than 1 µm (the diameters varying within these limits according to the initial mineral particles used, especially according to their nature and their specific surface area, the diameter distribution also possibly being more or less narrow or tight about a peak). As indicated previously, the macropores have diameters (i.e. have a diameter distribution) of between 10 microns and 3 mm, advantageously greater than 50 µm or even greater than 100 µm, and advantageously less than 500 µm, or even less than 300 µm.

Advantageously, the abovementioned mineral particles are based on silicon (di- or tetra-) oxides and/or derivatives thereof (salts, esters), in particular incorporating alkaline-earth metals (Ca, Mg) or other metals (Al), and these particles are especially (at least one of the following materials or of the following type): silica, a silicate (in particular an alkali metal or alkaline-earth metal silicate, and preferably containing calcium and/or magnesium), and/or a clay, and/or the abovementioned mineral particles are based on dolomites (of general formula $AB(CO_3)_2$ in which A may be a calcium, barium and/or strontium atom and B may be iron, magnesium, zinc and/or manganese) and/or carbonates, in particular calcio-magnesium compounds (based on calcium and/or magnesium), as described in greater detail herein below.

Preferably, the pore volume for the submicron pores ranges from 0.5 to 3 $cm^3/g$ and especially between 0.5 and 3 $cm^3/g$, and the pore volume for the macropores is greater than 1 $cm^3/g$ (i.e. 1 $cm^3$ per gram of material), preferably greater than 3 $cm^3/g$ and in particular ranges from 5 to 15 $cm^3/g$. The pore volume for the submicron pores ($V_{sm}$) is determined by mercury porosimetry formed on Pascal 140 and Pascal 440 reference machines sold by the company Thermo Scientific, and is considered as being equal to the cumulative volume of mercury introduced into the pores for mercury pressures of greater than 1.47 MPa (pressure calculated by the Washburn equation—Washburn, 1921—for a pore diameter of 1 micron) and ranging especially up to 400 MPa with the abovementioned machines, the pores being assumed to be cylindrical, assuming the surface tension of mercury to be equal to 480 dynes/cm and the mineral particle/mercury contact angle equal to 140°, the pore volume being given in $cm^3$ per gram of material. The pore volume of macropores ($V_m$) is determined by the formula:

$$V_m = 1/\rho_a - 1/\rho_s - V_{sm}$$

$\rho_a$ being the apparent mass per unit volume of the product (corresponding to the ratio of its mass to its volume), $1/\rho_a$ being the specific volume of the material, $\rho_s$ being the mass per unit volume of the skeleton (part of the product occupied by the dense matter/without pores), (which is predominantly) mineral, measured by helium pycnometry (standard ASTM C604—"standard test method for true specific gravity of refractory materials by gas-comparison pycnometer", $\rho_s$ being, for example, of the order of 2000 $kg/m^3$ for silica, the mass per unit volume thus being able to be divided by a factor of about 10 between the initial mass per unit volume of the particles and that of the finished material, this lightening resulting especially from the foaming and from the air introduced to this effect in a proportion of at least 65% by volume to obtain the product according to the invention)), and $1/\rho_s$ being the specific volume of the skeleton.

The total pore volume ($V_p = V_m + V_{sm}$) of the heat-insulating material according to the invention is advantageously greater than 1.5 $cm^3/g$ and preferentially between 5.5 and 18 $cm^3/g$.

The heat-insulating material according to the invention is in the form of a solid foam (generally rigid) of (or based on) porous mineral particles and is obtained in particular from the mixture of at least the following elements: an aqueous foam or water, mineral particles of submicron porosity (those mentioned in the preceding definition of the invention), generally incorporated into the foam or the water in the form of a dispersion/suspension, said particles having (initially, as introduced into the mixture) a specific surface area S of greater than 5 $m^2/g$ (the specific surface area being given in $m^2$ per gram of particle(s)), the mixture also possibly comprising, where appropriate, an organic binder and/or a mineral binder, and/or a surfactant, and/or a pore-forming agent, and/or fibers (or reinforcements), etc., as explained hereinbelow.

More generally, the invention relates to a foam (which is solid, as opposed to the "aqueous foam" used to obtain it) for heat insulation, this foam (forming the abovementioned product according to the invention) being formed from porous mineral particles (this foam being termed a "mineral particle foam"), and incorporating two different ranges of porosity, a first range of (macro)pores with diameters of between 10 microns and 3 millimeters, and a second range of submicron pores with diameters of greater than 4 nm and less than 1 micron and whose pore volume is at least 0.5 $cm^3/g$, the apparent density of the foam being less than 300 $kg/m^3$.

The creation of this submicron porosity (or pore volume at the submicron scale) trapping air in a structure (a foam) that already has (macro)pores (this macroporosity originating from the aqueous foam and corresponding to the air bubbles introduced, the size of the bubbles and the resulting substantially spherical macropores being relatively regular, with a more or less narrow or tight diameter distribution in particular between 50 μm and 500 μm, as already mentioned), and in the zones (or "walls") between said (macro) pores, improves the thermal performance qualities of the product, while at the same time giving a product that is comparatively lighter due to the presence of these additional pores, this additional porosity in the walls of the foam being provided especially by the intraparticulate porosity (initially present in the particles used and generally resulting from their synthesis), and also resulting from the stacking of these porous particles to constitute the walls of the foam. The foams thus obtained according to the invention have heat-insulating properties that are improved when compared with more standard inorganic foams of the same density, or when compared with common organic cellular insulators of polystyrene type, while at the same time being (more) economical and remaining light, and while having better aging resistance and fire resistance than organic products with equivalent heat-insulating performance qualities. Said materials/foams are compatible both for use as filling material and for surface use, especially on a façade.

The thermal performance qualities of the insulator according to the invention are reflected by heat conductivity values λ (global) of less than 40 mW/m·K, especially between 20 and 40 mW/m·K approximately, in particular less than 35 mW/m·K approximately and preferably less than 30 mW/m·K approximately, descending especially to 25 mW/m·K, or even less (the thermal performance qualities being proportionately better the lower the heat conductivity). The heat conductivity λ (in W/m·K) represents the amount of heat passing through the insulator (one meter thick, per $m^2$ and when the temperature difference between the two faces is 1° K). The heat conductivity values λ (compared at identical pressure and temperature, in particular at atmospheric pressure (1 bar) and room temperature, are measured in the context of the invention with an HFM 436 series flowmeter from the company Netzsch™ according to the protocols established by standards ASTM C518 and ISO 8301. The characterization temperature is about 25° C., and the measurements are taken at atmospheric pressure, the precision of the measurements being estimated at 5%.

For comparative purposes, the gain in efficiency of heat conductivity for the product according to the invention may be at least 20% or 25% (less heat conductivity) relative to a similar solid foam (mineral and of the same density) but obtained without the porous particles and not having the double porosity (but only the macropores), for example relative to a glass foam obtained especially from glass that is melted and then introduced into a foaming oven, as illustrated hereinbelow in the comparative examples.

The product according to the invention is also much easier to obtain than aerogels (which, on account of their hydrophobic nature, do not make it possible especially to truly obtain a foam and do not generate double porosity as defined according to the invention), obtained starting with precursors/starting materials and by performing a chemical reaction to form the mineral substance forming them (whereas, in the case of the product according to the invention, the mineral substance employed—the mineral particles (thus other than aerogels)—is already formed and simply put into form without making use of treatments for degrading them (grinding, etc.) or for modifying their chemical composition, as is seen in the process according to the invention explained hereinbelow). The porous structure of the product according to the invention and/or said product is thus advantageously formed without chemical reaction or alteration as mentioned previously. The same observation may be made by comparison of meso- or nanoporous structures or foams existing in other fields or applications (for example used for molecular sieves and obtained, for example, via a sol-gel route from precursors) which, having different specificities and constraints, usually result from chemical reactions or from mechanical degradation operations. The product according to the invention is obtained via a simpler process that is more economical to implement.

The apparent mass per unit volume of the material (or product or foam) according to the invention is less than 300 kg/m$^3$, and depends on the formulation (amount of water, nature and amount of additives, the pH, etc.) and also on the foaming conditions (foaming time, stirring speed, geometry of the tank and paddle). The mass per unit volume is determined by establishing the ratio of the mass of a given volume of the material to said volume. Preferably, the mass per unit volume of the insulating material according to the invention is less than or equal to 200 kg/m$^3$, in particular less than 130 kg/m$^3$, advantageously less than 120 kg/m$^3$, or even less than 100 kg/m$^3$, and even less than 80 kg/m$^3$.

The material according to the invention is predominantly (to at least 80% by weight or even 90%), or even solely, mineral/inorganic (the organic materials that may be present possibly being, where appropriate, an organic binder, an organic graft, etc.), which makes it possible especially to ensure good fire resistance. The material is also essentially (to at least 80% by weight, or even 90%) formed from the abovementioned mineral particles in a foam structure. These mineral particles may have various shapes (rounded, star, platelet, etc.) are solid and porous, are formed from inorganic molecules, especially based on oxide(s), and are used directly to form the product without modification of their formula.

The mineral particles are generally (initially) in the form of a powder, whose particle size advantageously ranges from 1 μm to 500 μm of median diameter D50, this diameter being measured by particle size analysis by laser scattering according to standard ISO 13320-1:2000 especially, the powder being, where appropriate, in dispersion, especially in water (oil especially also possibly being added, for example for a surfactant and consolidating effect, and/or a binder especially), and used (or incorporated) in the form of said dispersion to form the product according to the invention. Preferably, the particle size (D50) is less than 100 μm, in particular less than 10 μm.

The initial specific surface area S of these mineral particles is preferably greater than 5 m$^2$/g, in particular greater than 10 m$^2$/g and advantageously greater than 20 m$^2$/g, more particularly greater than 30 m$^2$/g and especially greater than 50 m$^2$/g. Advantageously, it is even greater than 60 m$^2$/g, preferably greater than 70 m$^2$/g, more advantageously greater than 80 m$^2$/g and even more preferably greater than 90 m$^2$/g, or even 100 m$^2$/g. Preferably also (these particles generally and advantageously being hydrophilic in order to be able to be dispersed in water without addition of a component or surfactant to this effect), it is less than 500 m$^2$/g, in particular less than 300 m$^2$/g, especially less than 250 m$^2$/g (to avoid degradation of the thermal performance qualities due to said hydrophilic nature).

The specific surface areas, expressed in m$^2$/g, are measured by adsorption of nitrogen (theory of multiple adsorption of gases by means of Brunauer, Emmett and Teller determinations—BET method) in accordance with standard ISO 9277: 2010.

Preferably, the mineral substance forming the mineral particles is chosen from at least one of the following substances: at least one silica, in particular an amorphous silica, such as a precipitated silica, a pyrogenic silica, a fumed silica, at least one carbonate (in particular calcium carbonate or magnesium carbonate, this carbonate generally being a synthetic carbonate), at least one silicate (in particular calcium silicate), and/or at least one clay.

In a first embodiment of the invention, the mineral particles are chosen from silicates and/or carbonates, in particular alkali metal or alkaline-earth metal silicates and/or carbonates, and preferably chosen from calcio-magnesium compounds, such as calcium and/or magnesium silicates and/or carbonates. The submicron pores in the product according to the invention formed from such particles in particular have a diameter of between 10 nm and 1 μm (i.e. each pore of this category has a diameter that is within this range, the distribution of all the diameters of these pores being more or less narrow or tight), in particular between 100 nm and 1 μm and especially between 500 nm and 1 μm.

In a second embodiment of the invention, the mineral particles are silica particles, the heat-insulating material according to the invention then being a silica foam. Preferably, it is an amorphous silica (incorporated especially in the form of a silica powder). The submicron pores in the product according to the invention formed from such particles in particular have a diameter of less than 300 nm.

It is also possible, where appropriate, to combine several types of porous mineral particle (for example to use in combination silica particles and carbonate particles to form the product according to the invention).

Besides the mineral particles, the material according to the invention is formed from water or an aqueous phase (the presence of another medium also, for example oil and/or an alcohol, especially glycerol, not being excluded), the mineral particles being contained or incorporated in this medium, and this medium being foamed (method known as "direct foaming" according to the invention), and/or the material according to the invention is formed from an already-formed aqueous foam, into which the particles are added (especially in the form of a dispersion, generally an aqueous dispersion) (method known as "incorporation" according to the invention). The term "aqueous foam" means any type of foam obtained by a disordered stacking of gas bubbles in an aqueous phase. This liquid of soapy appearance or the starting aqueous phase that has not yet been foamed in which are found the particles before foaming generally comprise at least one surfactant compound.

As surfactant (or foaming agent), use may be made, in particular with the mineral particles of carbonate, silicate, clay or silica type, of at least one (salt of an) anionic surfactant, selected in particular from one of the following compounds of general formula: R—X$^-$, Y$^+$, for which R is an aliphatic chain of 10 to 24 carbon atoms, X⁻ is a group bearing a negative charge (carboxylate, sulfate, sulfonate, etc. group), and Y⁺ is a counter-cation selected from ammonium, sodium and potassium groups, for example carboxylate salts comprising 12 to 24 carbon atoms, selected especially from myristate, palmitate, stearate and oleate salts, or the conjugated base of behenic acid, or carboxylates derived from the treatment of tallow fatty acids, or alternatively other conjugate bases of fatty acids, for instance soaps/shower gels comprising fatty acids derived from natural sources such as tallow, coconut oil, etc., for example surfactants such as ammonium stearate, etc.

Depending on the mineral substances (for example in the case of carbonates), use may also or alternatively be made of at least one cationic surfactant salt chosen, for example, from alkyltrimethylammonium salts containing an alkyl group comprising 10 to 22 carbon atoms, in particular from at least one of the following compounds: dodecyltrimethylammonium bromide (or chloride), tetradecyltrimethylammonium bromide (or chloride), hexadecyltrimethylammonium bromide (or chloride), octadecyltrimethylammonium bromide (or chloride), cetyltrimethylammonium bromide (or chloride), cetylbenzyldimethylammonium chloride, cetyltriethylammonium bromide, tallowtrimethylammonium chloride, etc.

In the case of the use of an anionic surfactant and a cationic surfactant in combination, the preparation of an aqueous foam may be performed, for example, as described in patent application WO96/25475 or starting from two-component kits sold by the company Allied Foam (referenced, for example: 425A and 510B), consisting of a first aqueous mixture containing an anionic surfactant and of a second aqueous mixture comprising a cationic surfactant and a latex, etc.

One or more zwitterions may also be used as surfactant(s). Among the zwitterions, mention may be made especially of amino acids or derivatives, molecules synthesized from amino acids, etc.

Generally, the mixture (for obtaining the insulating material or the mixture of particles) or the (aqueous phase giving the) aqueous foam comprises less than 5%, advantageously less than 2%, or even less than 1% of surfactant, which is preferably anionic, and/or of zwitterion(s).

It is also possible, especially in combination with the use of a surfactant, to use a pore-forming agent in the mixture. In the present invention, the term "pore-forming agent" denotes any substance that is capable of generating porosity in a material by means of a treatment subsequent to the insertion of this agent into the material in order to remove said agent at least partially. The addition of pore-forming agents allows, where appropriate, an additional increase in the pore volume. The aggregates of mineral substance become structured around the pore-forming agents, elimination of said agents resulting in the formation of porosity in a controlled manner.

The weight ratio of the mineral substance relative to the pore-forming agent is, for example, from 0.2 to 3 and especially from 0.7 to 2.5. At least 10% (by weight), especially at least 30%, in particular at least 50% and preferably at least 90%, of the pore-forming agent is eliminated, for example by calcination or washing, during the manufacture of the insulating product (in particular after formation of the rigid foam).

Advantageously, the pore-forming agent is formed from a material whose calcination temperature is below the melting point and/or sintering point of the mineral substance in which it is enclosed. In the case of precipitated silicas, the calcination temperature of the pore-forming agent should be, for example, less than 700° C.

The pore-forming agent is, for example, based on/in the form of particles, which are generally spherical, of at least one organic material, for example a polymer, especially in colloidal form. It may be, for example, at least one organic particle, consisting of (co)polymers containing amphiphilic or stereoregular blocks comprising blocks AB or ABA (A representing a hydrophilic block such as polyethylene oxide or polyacrylic acid and B a hydrophobic block such as polystyrene, polypropylene oxide, polyisoprene or polyvinylpyridine). They may also be starch particles and/or inorganic salts, such as NaCl (incorporated into the aqueous mixture containing, where appropriate, a cosolvent, such as ethanol, the inorganic salts being removed thereafter by washing). Preferably, the agent under consideration is latex particle(s) and/or a colloidal dispersion of polymer(s) and/or of particle(s) consisting of macromolecule(s), chosen from those rather giving spheres. The latex may especially comprise: a (co)polymer of vinyl type, advantageously of acrylic and/or carboxylic acid derivative type, a copolymer of vinyl chloride and of olefin, optionally silanized, etc. It may be a commercial latex such as the polyurethane Baybond XP 2602 sold by the company Bayer, a latex in the form of an oxidized or non-oxidized polyethylene wax, optionally with an acrylic copolymer (such as those sold by Rohm & Haas and from the company Dow Chemical), a styrene-acrylic copolymer or any acrylic obtained by emulsion or dispersion radical polymerization (those sold by the company BASF in the Acronal® range), etc. Preferably, it is at least one water-dispersible acrylic copolymer (such as those sold under the reference Neocryl® by the company DSM, such as Neocryl® XK-52, Neocryl® BT 21 or Neocryl® BT 100). The latex (latices) used as pore-forming agent(s) advantageously have a glass transition temperature Tg of greater than 50° C., especially between 50 and 200° C. and in particular between 70 and 170° C.

The pore-forming agents may be used in emulsion or dispersion, their mass content being, for example, between 5% and 75%, especially between 20% and 60% or even between 30% and 50% of the total weight of the emulsion or dispersion.

The mixture (for obtaining the insulating material/the foam or the mixture of particles) may also comprise at least one organic and/or mineral binder, used, for example, for bonding the particles together and/or for bonding the particles to the rest of the structure of the material.

The binder may advantageously be a latex (chosen especially, this time, from those with a tendency to form films, this binder especially making it possible to reinforce the foam), in particular an emulsion or aqueous dispersion of one or more natural or synthetic polymer substances, which are generally thermoplastic. This latex binder preferentially has a glass transition temperature Tg of less than 50° C., in particular between −50° C. and 25° C., preferably between −20° C. and 10° C., advantageously between −10° C. and 0° C., and preferentially has a film-forming temperature of less than room temperature, in order to obtain the desired strength for the insulating materials to be applied to a support in the field of building construction especially. The latex may contain a (co)polymer of vinyl type (for example based on vinyl acetate, in particular a polyvinyl acetate homopolymer, or based on a copolymer of vinyl acetate and of (meth)acrylic or maleic acid and/or ester, olefin and/or vinyl chloride, or based on a vinyl chloride/ethylene copolymer), or of acrylic type (especially an acrylonitrile/acrylic ester copolymer, or styrene/silanized acrylic acid or ester copolymer and/or carboxylic acid derivative copolymer). The latex may especially be a styrene-acrylic copolymer or any acrylic. These latices are, for example, those sold by the company BASF in the range referenced under the name Acronal®, in particular Acronal® S 400.

Other additives may also be added (especially to the mixture of particles or the mixture used to obtain the foam/the product according to the invention or to the aqueous foam or particles), such as rheological agents (plasticizer, such as glycerol, etc.), water-retaining agents (such as gelatin or glycerol, etc.), opacifiers (for example aluminum or graphite as infrared opacifier), mineral fillers, or other materials for reinforcing the mechanical strength (glass or organic fibers, silicate, gypsum, cement, organic binders of latex type as explained previously, etc., or limiting the contraction of the foam or the disproportion of the bubbles and reducing their size (the foaming being performed, for example, under a perfluorohexane atmosphere), etc.

In particular, the heat-insulating material according to the invention may be prepared from at least the following elements, in the amounts expressed as weight percentages relative to the total mass of the mixture: from 40% to 95% water, from 5% to 60% mineral particles and from 0 to 15% additive(s) (binder, opacifier, hydrophobizing agent, surfactant, pore-forming agent, etc.).

The present invention thus makes possible the manufacture of a wide variety of highly insulating materials based on various mineral particles and, where appropriate, various additives, to cover a wide range of insulating applications, especially in the building sector.

A subject of the invention is also a process for manufacturing the heat-insulating material described previously, comprising the following steps:

at least one step of preparing a mixture (or assembly), generally aqueous (dispersion, in particular suspension in water), of mineral particles with a specific surface area S of greater than 5 m$^2$/g, and having a pore volume of at least 0.5 cm$^3$/g in the porosity range of between 4 nm and 1 micron;

at least one step of preparing a foam (aqueous (or wet)) including said particles (from the abovementioned mixture of particles and/or by incorporating said mixture of particles into an aqueous foam formed separately);

at least one step of putting in form (generally to form a monolith and/or a layer), especially by molding or casting or spraying (onto a surface or wall) of this foam;

at least one step of at least partial drying (by leaving to dry or by drying) the foam or the material thus obtained.

Several methods may be used for the preparation of the aqueous foam comprising the particles/the aqueous mixture of particles, for example:

by direct foaming: i.e. by introducing a gas into the mixture of particles via various methods such as: mechanical stirring, sparging with a gas, for example through a sinter (porous plate through which the gas is passed in order to generate the foam), in-situ bubbling of a dissolved gas (for example pentane) or of a gas by chemical reaction, especially by decomposition (for example of hydrogen peroxide into water and dioxygen), etc., and/or by incorporation: i.e. the incorporation of the mixture of particles into an already-preformed aqueous foam (or, conversely, the incorporation of the preformed foam into the mixture of particles), said foam being prepared, for example, by foaming using a dispersion (generally aqueous) into which is introduced a gas via one of the above methods, the actual foaming generally taking place in the presence of at least one surfactant (adding to the mixture of particles in the case of direct foaming, or the surfactant being present in the dispersion that is foamed to form the aqueous foam in the case of incorporation).

It is also possible to add to the mixture of particles and/or to the aqueous foam various additives such as pore-forming agents, organic or mineral binders, rheological agents (plasticizer), hydrophobizing agents, etc.

The step of putting in form may comprise operations of casting or molding of the foam comprising the particles in cavities of appropriate shape or cross section or of spraying of the foam onto a surface or wall. The term "molding" should be taken in the broad sense and covers any form of conformation, such as casting in an open mold, extrusion through a die and chopping of the extrudate, etc., the drying generally being consecutive to the putting in form.

The process according to the invention may also include, where appropriate, after drying:

optionally at least one step of heat treatment for consolidating the material and/or for removing, where appropriate, the pore-forming agent;

optionally at least one step of hydrophobation of the material obtained.

The heat-insulating material obtained is solid (and generally rigid) and multi- (in particular bi-) porous. It is generally (designed) in the form of a panel whose thickness is at least equal to 5 mm. It may also be obtained in the form of at least one layer applied for example, to a plasterboard, or the material while still wet may be impregnated or spread onto a web (for example a nonwoven, etc.), or the material may be combined with a fiber matrix or another layer, etc.

The present invention also relates to the use of the insulating material/of the foam according to the invention in the construction sector, especially for insulating the walls of buildings.

The present invention and the advantages thereof will be understood more clearly on reading the examples described below, which are given as nonlimiting illustrations.

EXAMPLE 1

In this example, a calcium carbonate foam was manufactured as follows:

6.25 g of a calcium carbonate sold by the company Solvay under the reference Socal 31 were dispersed in 25 g of water using an IKA paddle (helical stirrer), and 1.11 g of a latex (organic binder) sold by the company BASF under the reference Acronal S400 were then added to this dispersion. The mixture was homogenized using an IKA paddle at a speed of 200 rpm.

In a second container, an aqueous foam was prepared from two solutions of surfactants sold by the company Allied Foam under the references AFT 425 A and AFT 510B and composed as follows:

reference AFT 425A consisting of (weight percentages):
mixture of cationic surfactants belonging to the class of long-chain alkyls: 50-60%
mixture of nonionic phenoxy surfactants: 10-20%
ethanol: 5-8%
water: 12-35%
reference AFT 510B consisting of:
mixture of acrylic polymers: 25-35%
mixture of anionic surfactants belonging to the class of fatty acids: 15-30%
water: 35-60%

10 g of AFT425A were taken up and 100 g of water were added thereto. The mixture was foamed by mechanical action using a Kenwood brand household blender for 3 minutes at maximum speed. 20 g of the solution AFT 510 B were then added with stirring over about 1 minute and the mixture was mixed for 2 minutes 30 seconds at maximum speed using the household blender.

To prepare the carbonate foam, 1.5 g of the resulting liquid foam were taken up and introduced by spatula into the aqueous dispersion based on calcium carbonate and Acronal S400. The whole was homogenized using the IKA paddle at a speed of 200 rpm.

The wet foam was then cast in a Teflon mold and placed in an oven at 40° C. for 48 hours.

The product according to the invention obtained, having the two ranges of porosities according to the invention (in particular macropores with diameters of between 10 µm and 3 mm, and submicron pores with diameters greater than 4 nm and less than 1 micron) and containing more than 65% by volume of air, was characterized according to the methods mentioned in the text hereinabove, the values obtained being as follows:

mass per unit volume: 127 kg/m$^3$;
pore volume of the macropores with diameters of between 10 microns and 3 mm: at least 5.15 cm$^3$/g;
pore volume of the submicron pores with diameters of between 4 nm and 1 µm: 0.84 cm$^3$/g;
heat conductivity: 33.7 mW/m·K±10%.

The values indicated show that the heat-insulating inorganic material obtained had a low mass per unit volume at the same time as a high porosity with two types of porosity, including pores with a diameter of between 4 nm and 1 micron, and had particularly advantageous thermal performance qualities.

EXAMPLE 2

In this example, a silica foam was manufactured as follows:

Precipitated silica sold by the company Rhodia under the reference Tixosil T365 (with a median diameter D50 of about 3.5 microns and a specific surface area of about 130 m$^2$/g) was dispersed in water, and an ammonium polyacrylate anionic surfactant sold by the company Zschimmer & Schwartz under the reference Schaümungsmittel W53FL, water-retaining agents (in the present example: gelatin and glycerol, the glycerol also acting as plasticizer) and a mineral binder (in this case sodium silicate) were then added to this dispersion, followed by mechanical stirring using a blender such that the volume of the wet foam thus obtained was equal to about 3 times the initial volume of the non-foamed dispersion.

The composition of the mixture was as follows (expressed as weight percentages): water: 73.4%; precipitated silica: 18.2%; sodium silicate: 2.7%; gelatin: 3.2%; glycerol: 0.5%; surfactant: 1.9%.

The wet silica foam was then cast in a Teflon mold and placed in an oven at a temperature below 25° C. and at 80% relative humidity for 3 days. Once dried, the foam or paste, which has undergone a loss of mass of about 80%, was hardened, in the form of a solid. The monolith was then placed in a closed chamber containing hexamethyldisilazane (HMDS) as hydrophobic agent (this compound being sold under the reference 52619 of the Fluka brand by the company Sigma-Aldrich) for 4 hours at 80° C.

The product obtained, having the two ranges of porosities according to the invention (in particular macropores with diameters of between 10 µm and 3 mm, and submicron pores with diameters of greater than 4 nm and less than 1 micron) and containing more than 65% by volume of air was then characterized according to the methods mentioned in the text hereinabove, the values obtained being as follows:

mass per unit volume: 200 kg/m$^3$;
pore volume of the macropores with diameters of between 10 microns and 3 mm: at least 3.3 cm$^3$/g;
pore volume of the submicron pores with diameters of between 4 nm and 1 µm: 1.25 cm$^3$/g;
heat conductivity: 36 mW/m·K.

The accuracy of the measurements was estimated as 5%.

The values indicated show that the heat-insulating inorganic material obtained had a low mass per unit volume at the same time as a high porosity with two types of porosity, including pores with a diameter of between 4 nm and 1 micron, and had advantageous thermal performance qualities.

COMPARATIVE EXAMPLE

In this example, the characteristics of a glass foam sold under the reference FoamGlas S3 by the company Foamglas building were measured. This foam is purely mineral and has masses per unit per volume of the same order as those of the products according to the invention. However, unlike the products according to the invention, it only has one porosity range (macropores with diameters greater than 10 µm). The values obtained were as follows:

mass per unit volume: 130 kg/m$^3$;
pore volume of the macropores with diameters greater than 10 microns: 7.2 cm$^3$/g;
Heat conductivity: 45 mW/m·K.**

The accuracy of the measurements was estimated as 5%.

It was observed that for an equivalent mass per unit volume, the heat-insulating properties of the product according to the invention are much better than those of a "monoporous" foam such as in the present example (see for comparative purposes Example 1 according to the invention).

The products according to the invention are particularly suitable for heat insulation, in particular in the construction sector for insulating the walls (exterior or interior) of buildings.

The invention claimed is:

1. A heat-insulating material, formed from mineral particles comprising submicron pores,
    wherein the heat-insulating material incorporates two different ranges of porosities, including:
    a first range of macropores having diameters of between 10 µm and 3 mm; and
    a second range of submicron pores having diameters greater than 4 nm and less than 1 µm, the pore volume of said submicron pores being at least 0.5 cm$^3$/g, and
    wherein the heat-insulating material has a mass per unit volume of less than 300 kg/m$^3$.

2. The heat-insulating material of claim 1, wherein the heat-insulating material is predominantly inorganic.

3. The heat-insulating material of claim 1, wherein the heat-insulating material is obtained from a mixture comprising:
    an aqueous foam or water;
    mineral particles of submicron porosity, wherein said particles are incorporated into the aqueous foam or the water in the form of a dispersion/suspension and said particles have a specific surface area S of greater than 5 m$^2$/g; and
    optionally at least one additive selected from the group consisting of an organic binder, a mineral binder, a surfactant, and a reinforcement.

4. The heat-insulating material of claim 3, wherein the mixture further comprises a pore-forming agent.

5. The heat-insulating material of claim 1, wherein the mineral particles are based on silicon oxides and/or derivatives thereof, and/or a clay, and/or the mineral particles are based on dolomites and/or carbonates.

6. The heat-insulating material of claim 1, wherein the mineral particles are silicates or carbonates of an alkali metal or an alkaline-earth metal.

7. The heat-insulating material of claim 1, wherein the pore volume of the submicron pores is from 0.5 to 3 cm$^3$/g and the pore volume of the macropores is greater than 1 cm$^3$/g.

8. The heat-insulating material of claim 7, wherein the pore volume of the macropores is greater than 3 cm$^3$/g.

9. The heat-insulating material of claim 7, wherein the pore volume of the macropores is from 5 to 15 cm$^3$/g.

10. The heat-insulating material of claim 1, having a heat conductivity of less than 40 mW/m·K.

11. The heat-insulating material of claim 1, wherein the mineral particles are clay particles.

12. The heat-insulating material of claim 1, wherein the mineral particles are carbonate particles of an alkali metal or an alkaline-earth metal.

13. The heat-insulating material of claim 1, having a heat conductivity of less than 35 mW/m·K.

14. The heat-insulating material of claim 1, having a heat conductivity of less than 30 mW/m·K.

15. A process, comprising:
   heat-insulating a wall of a building with the heat-insulating material of claim 1,
   wherein the heat-insulating material is in the form of a panel, or in the form a layer applied to a board, or impregnated or spread onto a web, or combined with a fiber matrix or another layer or in the form of granules, blocks, layers, projections, moldings.

16. A process for manufacturing the heat-insulating material of claim 1, the process comprising:
   forming a mixture comprising mineral particles having a specific surface area S of greater than 5 m$^2$/g and having a pore volume of at least 0.5 cm$^3$/g in the porosity range between 4 nm and 1 micron;
   forming a foam comprising the mineral particles;
   putting the foam in form; and
   at least partial drying of the foam.

17. The process of claim 16, wherein the mixture further comprises at least additive selected from the group consisting of a pore-forming agent, a surfactant, an organic binder, an inorganic binder, a rheological agent, and a reinforcement.

18. The process of claim 16, further comprising, after the drying:
   heat treating the heat-insulating material.

19. The process of claim 16, wherein a foaming is performed by direct foaming of the mixture or by incorporating the mixture into a preformed aqueous foam.

20. The process of claim 16, further comprising, after the drying:
   hydrophobizing the heat-insulating material.

* * * * *